United States Patent [19]

Hanazaki et al.

[11] Patent Number: 4,655,951

[45] Date of Patent: Apr. 7, 1987

[54] COOLANT

[75] Inventors: Masayuki Hanazaki; Noriyuki Harada; Kaoru Shimada, all of Shizuoka, Japan

[73] Assignee: Nippon Light Metal Company Limited, Tokyo, Japan

[21] Appl. No.: 837,033

[22] Filed: Mar. 6, 1986

[51] Int. Cl.⁴ ................................................ C09K 5/06
[52] U.S. Cl. ........................................ 252/70; 252/68; 252/69; 252/75; 62/342; 62/343
[58] Field of Search ...................... 252/68, 69, 70, 75; 62/342, 343

[56] References Cited

U.S. PATENT DOCUMENTS 2,378,087  6/1945  Kearney ................................. 252/70
3,834,456  9/1974  Clarke et al. ......................... 252/70
3,928,252 12/1975  Rigler et al. ......................... 426/572

FOREIGN PATENT DOCUMENTS 59-131687  7/1984  Japan .

Primary Examiner—Robert A. Wax
Attorney, Agent, or Firm—Eric P. Schellin

[57]  ABSTRACT

A coolant, comprising an aqueous solution of potassium hydrogencarbonate, a polyhydric alcohol and, where desired, 1.0 to 20.0% by weight of saccharides, which may be additionally incorporated, for the purpose of protection against corrosion, with 0.01 to 0.5% by weight of at least one compound selected from the group consisting of alkali metal salts of silicic acid, alkali metal salts of metasilicic acid and alkali metal salts of polyphosphoric acid.

The coolant has an eutectic melting point as low as −8.5° C. or below and is less corrosive to metal containers. In addition, the potassium hydrogencarbonate in the coolant is quite stable, so that the bubbling phenomenon of the coolant could be prevented.

7 Claims, No Drawings

COOLANT

BACKGROUND OF THE INVENTION

1. Field of the Invention

The present invention relates to a coolant and, more particularly, to a coolant for a cooler box to be used for the preparation, mainly at home, of frozen sweets, such as ice creams and sherbets, and the transportation or delivery, while being cooled, of processed foods or frozen foods, as well as for leisure purposes. In another aspect, it relates to a coolant having an anticorrosion effect for a metal container in which it is to be enclosed.

2. Description of the Prior Art

Upon preparation, at home, of frozen sweets, such as ice creams and sherbets, there have been used a combination of an outer container charged with a mixture of salt and ice, and an inner container placed in the outer container and charged with materials for preparing ice creams. For preparing a frozen sweet by such a combination of containers, however, a long period of time is required because of its low cooling capacity due to its limited cntact area between the inner container and the mixture of salt and ice.

It has been proposed to use a double walled container with a liquid coolant having a certain composition enclosed within its walls. An example of such a coolant is disclosed in Japanese Patent Application (Laid Open) No. 131,687/84, which is consisting of a mixture of an aqueous 16 to 18% solution of potassium hydrogencarbonate or potassium bicarbonate and 2 to 10%, based on the aqueous solution, of ethyl alcohol.

However, the known coolant has the following disadvantages. Its freezing point is not satisfactorily low. To be more specific, its freezing point could be hardly lower than $-8.5°$ C. even when it has an increased ethyl alcohol content. Potassium hydrogencarbonate contained therein is not stable enough not to be decomposed when exposed to heat. There is also a tendency that bubbles are generated upon the mixing of the aqueous solution of potassium hydrogencarbonate with ethyl alcohol. Because of this bubbling phenomenon, the coolant, when used in a closed container, often causes the deformation of its container. In addition, the coolant, when used in a metal container, causes the corrosion of its container after a long period of time.

SUMMARY OF THE INVENTION

It is therefore an object of the invention to provide a coolant having a satisfactorily low eutectic melting point as low as $-8.5°$ C. or lower than that.

It is another object of the invention to provide a coolant having an enhanced stability with regard to potassium hydrogencarbonate and free from the bubbling phenomenon.

It is a further object to the invention to provide a coolant having an excellent anticorrosive effect for a metal container.

According to the invention, there is provided a coolant comprising an aqueous solution of potassium hydrogencarbonate admixed with 1.0 to 20.0% by weight of a polyhydric alcohol and, where desired, a saccharide, which may be additionally incorporated with one or more corrosion inhibitors selected from the group consisting of alkali metal salts of silicic acid, alkali metal salts of metasilicic acid and alkali metal salts of polyphosphoric acid in an amount of 0.01 to 5% by weight.

The coolant according to the invention has the following advantages.

(1) The coolant has a freezing point as low as $-8.5°$ C. or lower than that and, therefore, ice creams having excellent qualities can be prepared even in the case of ice creams in which sugar is contained in large quantities;

(2) The freezing point of the coolant would never be lower than $-10°$ C. since the eutectic melting point intrinsic to potassium hydrogencarbonate can be retained and, hence, the undesirable adhesion of ice creams onto the inner surface of the double walled container can be suppressed and prepared ice creams can be easily removed therefrom;

(3) The coolant can be produced at a relatively low cost since a less expensive alcohol, such as propylene glycol, can be used therein instead of ethyl alcohol;

(4) Potassium hydrogencarbonate has an increased stability and the generation of bubbles, often seen in the prior coolant, can be suppressed, so that the swelling of the outer surface of a double walled container could be markedly reduced; and (5) The coolant is noncorrosive to aluminum and aluminum alloys and, therefore, can be safely used for a double walled container, which is conventionally made of aluminum or an aluminum alloy. The noncorrosiveness of the coolant can be further improved by incorporating therein one or more corrosion inhibitors selected from the group consisting of alkali metal salts of silicic acid, alkali metal salts of metasilicic acid and alkali metal salts of polyphosphoric acid in an amount of 0.01 to 0.5% by weight.

DETAILED DESCRIPTION OF THE INVENTION

The invention will be explained hereinbelow in detail.

In preparing the coolant according to the invention, commercially available potassium hydrogencarbonate can be used with or without further purification. It can be advantageous, in view of cost and easiness of production, to use a commercially pure potassium hydrogencarbonate without further purification. In the first step of its production, potassium hydrogencarbonate can be dissolved into water, which may be distilled water, ordinary city water etc., to form an aqueous solution having a concentration of 16 to 18%, preferably 16.95%.

The thus prepared aqueous solution of potassium hydrogencarbonate is then admixed with a polyhydric alcohol, such as propylene glycol, glycerol and the like, and, where desired, with a saccharide, such as sucrose, fructose and the like, to give a coolant according to the invention. The total amount of said polyhydric alcohol and polysaccharide is preferably from 1.0 to 20.0% by weight.

When the total amount of said polyhydric alcohol and saccharide is less than 1.0% by weight, the intended effect of its incorporation could hardly be attained. When it exceeds 20.0%, a coolant not having an appropriate eutectic melting point will be resulted.

As examples of alkali metal salts of silicic acid, metasilicic acid and polyphosphoric acid to be used as a corrosion inhibitor in the coolant according to the invention, mention may be made of alkali silicates, such as sodium silicate, potassium silicate and calcium silicate; alkali metasilicates, such as sodium metasilicate, potassium metasilicate and calcium metasilicate; and alkali polyphosphates, such as sodium polyphosphate and potassium polyphosphate. Of these alkali metal salts, sodium silicate, sodium metasilicate and sodium polyphosphate can be preferable. These compounds can be used either alone or in combination. Sodium silicate and a mixture of sodium silicate and sodium polyphosphate can be particularly preferable. It is also possible to use these corrosion inhibitors in combination with other known corrosion inhibitors, such as potassium phosphate and the like, depending on the kind of metal used for its container, the kind of coolant, and the like.

The ration of said corrosion inhibitor to said coolant can be varied in accordance with the kind, use, etc. of the coolant. In most cases, however, the corrosion inhibitor is used preferably in an amount of from 0.01 to 0.05% by weight of said coolant. When it is less than 0.01% by weight, no effects may be attained by its addition. When it more than 0.5% by weight, the freezing curve of the coolant may be adversely affected by its addition and, at the same time, the coolant could be harmful for the human body if drunken by mistake.

As a container for enclosing the coolant of the invention, there can be used with particular advantage a double walled container made of aluminum or an aluminum alloy although there is no particular restriction therefor. Aluminum or aluminum alloys which can be used for the container include those not subjected to any surface treatment, as well as those subjected to an anodic oxidation treatment to form a protective film on their surface.

The invention will hereinafter be illustrated by examples.

EXAMPLE 1

A coolant was prepared by incorporating 100 g of propylene glycol into 1 kg of aqueous 17% by weight solution of potassium hydrogencarbonate. This coolant was enclosed within the walls of a double walled container. The container was then cooled in a home freezer maintained at $-20°$ C., whereby the entire coolant was uniformly frozen at $-9°$ C. The thus cooled couble walled container was taken out of the freezer. A mixture of ice-cream materials consisting of 200 cc of fresh cream, two raw eggs (ca. 30 g) and 45 g of sugar was charged in the container at 10° C., and an ice cream was prepared therefrom.

EXAMPLE 2

A coolant was prepared by incorporating 125 g of glycerol into 1 kg of aqueous 17% by weight solution of potassium hydrogencarbonate. This coolant was enclosed in a double walled container as in Example 1 and cooled in the same manner as in Example 1, whereby it was uniformly frozen at around $-9°$ C. Into the container was then charged the same ice-cream mixture as the one used in Example 1, and an ice cream was prepared therefrom.

EXAMPLE 3

A coolant was prepared by incorporating 50 g of sucrose and 105 g of glycerol into 1 kg of aqueous 17% solution of potassium hydrogencarbonate. This coolant was enclosed in a double walled container and cooled under the same conditions as in Example 1, whereby it was uniformly frozen at around $-9°$ C. Into the container was charged the same ice-cream mixture as in Example 1, and an ice cream was prepared therefrom.

EXAMPLE 4

A coolant was prepared by incorporating 50 g of mannit and 70 g of propylene glycol into 1 kg of aqueous 17% solution of potassium hydrogencarbonate. This coolant was enclosed in a double walled container and cooled under the same conditions as in Example 1, whereby it was frozed at around $-9°$ C. Into the container was charged the same ice-cream mixture as in Example 1, and an ice cream was prepared therefrom.

In Examples 1 to 4 described above, excellent ice creams having a temperature of about $-4.0°$ C. were obtained in about 20 minutes, and the bottle surfaces of the double walled containers showed only very slight swellings.

COMPARATIVE EXAMPLE 1 (Ice Cream of Prior Art)

A coolant was prepared by incorporating 55 g of ethyl alcohol into 1 kg of aqueous 17% solution of potassium hydrogencarbonate. This coolant was enclosed in a double walled container as in Example 1 and cooled under the same condition, whereby it was uniformly frozen at around $-8°$ C. Into the container was charged the same ice-cream mixture as in Example 1, and an ice cream was prepared therefrom.

The thus prepared ice cream had generally good qualities but showed a tendency to be undesirably soft in the case where the mixture had a high sugar content. In addition, the surfaces of the container's bottom showed a slight swelling.

COMPARATIVE EXAMPLE 2

In this comparative example, aqueous 17% by weight solution of potassium hydrogencarbonate was used as a coolant. The coolant was enclosed in a double walled container and cooled in the same manner as in Example 1, whereby it was uniformly frozen at around $-6°$ C. Into the thus cooled container was charged the same ice-cream mixture as in Example 1, and an ice cream was prepared therefrom.

The thus obtained product showed a tendency to be generally soft.

EXAMPLES 5-8 AND COMPARATIVE EXAMPLES 3-4

(1) BEAKER TEST

Corrosion inhibitor-containing coolants were prepared by additionally incorporating 0.5% by weight, based on the total weight of the resulting coolant, of sodium silicate [Example 5], a 1:1 (based on weight) mixture of sodium metasilicate and sodium polyphosphate [Example 6], sodium polyphosphate [Example 7] or sodium metasilicate [Example 8] into the same coolant as the one used in Example 1.

The coolants were charged into separate beakers, and test pieces of plain Aluminum Alloys A-3004 and A-1050 and anodic Aluminum Alloys A-3004 and A-1050 each having an anodized film of $6\mu$ were dipped therein, and the beakers were allowed to stand at 40° C. for 4 weeks. Thereafter, the amount of dissolved aluminum was measured (Al: mg/l) and the appearance of the coolants were observed and rated in three grades: A, good; B, partly discolored; and C, completely discolored.

For the purpose of comparison, the above tests were repeated, using a coolant having the same composition as those used above, except that a phosphate was used as a corrosion inhibitor [Comparative Example 3] or that a coolant containing no corrosion inhibitors and consisting of aqueous 17% solution of potassium hydrogencarbonate alone was used [Comparative Example 4]. Results obtained are shown in Table 1.

(2) Container Test

The coolants used in the above beaker tests were enclosed in separate double walled containers of plain Aluminum Alloy A-3004 provided with fins of plain Aluminum Alloy A-1050 bridging the inner and outer surfaces thereof.

The containers were subjected to two different storage tests, and the amount of dissolved aluminum was measured (Al: mg/l). In one test (Test A), they were stored at 40° C. for 4 weeks. In the other test (Test B), they were stored at 40° C. for 7 hours and then at −20° C. for 17 hours, and this heating-cooling cycle was repeated for 4 weeks. Results obtained are shown in Table 1.

weight, aluminum was dissolved into the coolants in undesirably large amounts. In cases where it was greater than 0.5% by weight, the pH value of the coolants exceeded the allowable level and desired cooling effects were not attainable. In addition, the presence of excessive amount of corrosion inhibitors would be dangerous for the human body if drunken by mistake or leaked from the container and contaminated into foods.

What is claimed is:

1. An anti-corrosive coolant having an eutectic melting point of about −8.5° C. to about −10.0° C. and characterized by bubbling prevention stability that prevents deformation of aluminum vessels in which it is confined, consisting essentially of an aqueous solution of potassium hydrogencarbonate in amounts of from about 16 to 18% by weight and from about 1.0 to 20.0% by weight of a polyhydric alcohol further containing a saccharide and 0.01 to 0.05% by weight of a corrosion inhibitor.

2. A coolant according to claim 1, wherein said polyhydric alcohol is propylene glycol or glycerol.

TABLE 1

| | | Beaker Test** | | | | | | | | Container Test | |
| | | Aluminum Alloy A-3004 | | | | Aluminum Alloy A-1050 | | | | Amount of Dissolved Aluminum | Amount of Dissolved Aluminum |
| | Corrosion Inhibitor Used* | Plain | | Anodized | | Plain | | Anodized | | | |
| Example | | Amount of Dissolved Aluminum | Appearance | Amount of Dissolved Aluminum | Appearance | Amount of Dissolved Aluminum | Appearance | Amount of Dissolved Aluminum | Appearance | | |
| Example 5 | SS | Less than 0.1 | A | Less than 0.1 | A | Less than 0.1 | A | Less than 0.1 | A | Less than 0.1 | Less than 0.1 |
| Example 6 | SMS + SPP | Less than 0.1 | A | Less than 0.1 | A | Less than 0.1 | A | Less than 0.1 | A | Less than 0.1 | Less than 0.1 |
| Example 7 | SSP | 0.2 | B | 0.1 | A | Less than 0.1 | B | 0.1 | A | 0.2 | 0.2 |
| Example 8 | SMS | Less than 0.1 | B | Less than 0.1 | A | 0.1 | A | Less than 0.1 | A | 0.1 | 0.2 |
| Comparative Example 3 | PE | 0.4 | C | 0.2 | C | 0.2 | B | 46.7 | B | 1.4 | 1.4 |
| Comparative Example 4 | None | Less than 0.1 | C | Less than 0.1 | C | Less than 0.1 | B | 0.2 | C | 0.3 | 3.2 |

*In the above table, the abbreviations show the following materials.
SS: Sodium silicate, SMS: Sodium metasilicate, SPP: sodium polyphosphate, and PE: Phosphoric ester
**Coolant volume per unit area 3.3 ml/cm²

(3) Test for Setting Range of Corrosion Inhibitor

In order to establish the appropriate range of corrosion inhibitors to be incorporated into the coolant according to the invention, two week beaker tests were carried out at a temperature of 40° C., using the hydrogencarbonate coolants employed in Examples 4 to 8 and varying amounts of corrosion inhibitors used in Example 5 to 8, namely sodium silicate, sodium polyphosphate, sodium metasilicate, or a mixture of sodium metasilicate and sodium polyphosphate. Thereafter, the amount of dissolved aluminum was measured, and the change in their appearance was observed. The results of these tests showed that the corrosion inhibitors can be used preferably in an amount of from 0.01 to 0.5% by weight. In cases where it was lower than 0.01% by 3. A coolant according to claim 1, wherein said saccharide is sucrose or fructose.

4. A coolant according to claim 1, wherein said corrosion inhibitor is selected from the group consisting of alkali metal salts of silicic acid, alkali metal salts of metasilicic acid and alkali metal salts of polyphosphoric acid.

5. A coolant according to claim 4, wherein said alkali metal salt of silicic acid is sodium silicate.

6. A coolant according to claim 4, wherein said alkali metal salt of metasilicic acid is sodium metasilicate.

7. A coolant according to claim 4, wherein said alkali metal salt of polyphosphoric acid is sodium polyphosphate.

* * * * *